(12) United States Patent
Viviroli et al.

(10) Patent No.: US 9,397,488 B2
(45) Date of Patent: Jul. 19, 2016

(54) METHOD FOR STRIPPING A CABLE

(71) Applicant: KOMAX HOLDING AG, Dierikon (CH)

(72) Inventors: Stefan Viviroli, Horw (CH); Harald Müllers, Dietwil (CH); Benno Zemp, Eschenbach (CH); Chris Schnellmann, Sins (CH)

(73) Assignee: Komax Holding AG, Dierikon (CH)

( * ) Notice: Subject to any disclaimer, the term of this patent is extended or adjusted under 35 U.S.C. 154(b) by 146 days.

(21) Appl. No.: 14/048,105

(22) Filed: Oct. 8, 2013

(65) Prior Publication Data

US 2014/0041486 A1 Feb. 13, 2014

(30) Foreign Application Priority Data

Oct. 8, 2012 (EP) .................................... 12006947

(51) Int. Cl.
*H02G 1/12* (2006.01)
*H01R 43/28* (2006.01)

(52) U.S. Cl.
CPC ............. *H02G 1/1253* (2013.01); *H01R 43/28* (2013.01); *H02G 1/1256* (2013.01); *Y10T 29/49764* (2015.01); *Y10T 29/53013* (2015.01)

(58) Field of Classification Search
CPC ..... H02G 1/1253; H02G 1/1256; H01R 43/28
See application file for complete search history.

(56) References Cited

U.S. PATENT DOCUMENTS

| | | | | |
|---|---|---|---|---|
| 5,526,717 A | * | 6/1996 | Koch | 81/9.51 |
| 5,526,718 A | * | 6/1996 | Hoffa | 81/9.51 |
| 5,528,962 A | * | 6/1996 | Hoffa | 81/9.51 |
| 5,536,976 A | * | 7/1996 | Churchill | 307/11 |
| 5,539,967 A | * | 7/1996 | Nazerian et al. | 29/33 M |
| 5,630,341 A | * | 5/1997 | Hoffa | 81/9.51 |
| 5,640,891 A | * | 6/1997 | Hoffa | 83/155 |
| 5,653,016 A | * | 8/1997 | Hoffa | 29/825 |
| 5,664,324 A | * | 9/1997 | Hoffa et al. | 29/825 |
| 5,781,984 A | * | 7/1998 | Koch et al. | 29/564.4 |
| 5,934,161 A | * | 8/1999 | Keene | 81/9.51 |
| 5,937,511 A | * | 8/1999 | Hoffa et al. | 29/825 |
| 6,910,256 B2 | * | 6/2005 | Locher et al. | 29/564.4 |
| 7,140,273 B2 | * | 11/2006 | Palmowski et al. | 81/9.51 |
| 8,739,657 B2 | * | 6/2014 | Nakamura | 81/9.4 |
| 2001/0000354 A1 | * | 4/2001 | Nazerian et al. | 700/114 |

(Continued)

FOREIGN PATENT DOCUMENTS

| | | |
|---|---|---|
| DE | 102007053825 A1 | 5/2009 |
| JP | H07227022 A | 8/1995 |

(Continued)

*Primary Examiner* — David B Thomas
(74) *Attorney, Agent, or Firm* — Fraser Clemens Martin & Miller LLC; William J. Clemens

(57) ABSTRACT

A method for stripping a cable, the cable having a conductor encompassed by an insulation and extending in a longitudinal direction, includes cutting into the insulation with stripping blades, after which the insulation is removed by sliding the stripping blades in the longitudinal direction. During the removal procedure, the longitudinal position of the stripping blades is detected if it has been determined by a detection device that at least one of the stripping blades has come in contact with the conductor. Based on the longitudinal position of one or more contacts with the conductor, a classification of the cable as adequately or poorly stripped is carried out.

11 Claims, 1 Drawing Sheet

(56) References Cited

U.S. PATENT DOCUMENTS

| | | | |
|---|---|---|---|
| 2002/0059720 A1* | 5/2002 | Hoffa | 29/745 |
| 2004/0255723 A1* | 12/2004 | Palmowski et al. | 81/9.51 |
| 2005/0050713 A1* | 3/2005 | Locher et al. | 29/564.4 |
| 2005/0055822 A1* | 3/2005 | Locher et al. | 29/564.4 |
| 2005/0211025 A1* | 9/2005 | Steuri et al. | 81/9.51 |
| 2007/0121796 A1* | 5/2007 | Lurati et al. | 379/24 |
| 2007/0261228 A1* | 11/2007 | Locher et al. | 29/564.4 |
| 2009/0126181 A1* | 5/2009 | Locher et al. | 29/564.4 |
| 2010/0077899 A1* | 4/2010 | Yano et al. | 83/522.12 |
| 2010/0251857 A1* | 10/2010 | Whittaker et al. | 81/9.4 |
| 2011/0099796 A1* | 5/2011 | Jost et al. | 29/593 |
| 2011/0246095 A1* | 10/2011 | Lim | 702/35 |
| 2013/0125710 A1* | 5/2013 | Hombu | 81/9.51 |
| 2014/0033874 A1* | 2/2014 | Nakamura et al. | 81/9.4 |

FOREIGN PATENT DOCUMENTS

| | | |
|---|---|---|
| JP | 2008295209 A | 12/2008 |
| WO | 2012015062 A1 | 2/2012 |

\* cited by examiner

METHOD FOR STRIPPING A CABLE

FIELD

The invention concerns a method for stripping a cable, wherein the method is particularly suited for determining the conductor quality of a stripped conductor end of a cable. Furthermore, the invention concerns a device for stripping a cable with which this method can be executed.

BACKGROUND

Devices and methods for stripping electrical cables have been known and in use for some time. Ideally, the metal conductor is not damaged by the stripping. In practice it is, however, possible that conductor ends become damaged when they come in contact during stripping with, for example, the stripping blades or other stripping tools. In order to determine the quality of the stripping process, stripped conductor ends are subjected on a random basis to an optical inspection with a microscope. This testing procedure, first executed after completion of the stripping process, has some disadvantages. The method is complex and takes time because the stripped cable can only be released following the optical inspection. An, at most, necessary readjustment of the cutting depth and the so-called "wayback" (i.e. a reset motion, in which the blade is returned slightly, or opened, after the cutting) cannot be carried out efficiently, for which reason a comparably large number of rejected "poorly stripped" cables may result.

It is therefore an objective of the present invention to create a method for stripping cables with which the conductor quality of the stripped conductor ends of the cable can be readily and efficiently determined.

SUMMARY

According to the invention, the method for stripping cables includes after supplying a cable extending longitudinally, which consists of an electrical conductor (wire or braid) and an insulation encompassing the conductor, the insulation is first cut with at least one stripping blade. Subsequently, the cut insulation is removed by sliding the at least one stripping blade in the longitudinal direction. During this removal procedure, the longitudinal position of the at least one stripping blade is determined when it has been established by means of a sensor that the at least one stripping blade has come in contact with the conductor. The longitudinal position of the stripping blade can be readily determined, for example, by means of an optical, electromagnetic or mechanical position detection system or tracking system. The stripped cable is preferably fixed in position using a gripper, a clamping device or other means, such that, in the process of cutting and removing, the cable remains stationary, and no undesired motion on the part of the entire cable is possible. Because at any point in time in the stripping process, a contact with the conductor by the stripping blade, is detected, and the corresponding position of the stripping blade associated with the conductor contact is determined, an optimal quality regulation of the stripping process is ensured. The testing of the conductor quality of stripped conductor ends can be readily automated and can be reliably determined for each stripping.

In cutting into the insulation, the at least one stripping blade is preferably moved against the conductor in the radial direction. The use of a single stripping blade is sufficient for the stripping. It is preferable, however, to use a pair of blades having two stripping blades that can be moved in opposing directions between an open and closed position. Moreover, it is conceivable that, after cutting into the insulation, the at least one stripping blade carries out a return motion in the radial direction, away from the conductor ("wayback"), before the removal procedure. For the radial motion (cutting and, if applicable, return motion/wayback) and for the motion in the longitudinal direction (removal) of the at least one insulation blade, separate drives may be used, respectively.

In a first embodiment, the contacts with the conductor by the stripping blade can be depicted on a monitor screen of a display device. The point in time, or the position, at least with respect to the longitudinal direction, of the occurrence of a contact of the stripping blade with the conductor can be readily derived from a depiction of this type. Instead of a graphical depiction, the contacts with the conductor can also be outputted and displayed in a tabular form. The display means can, for example, be on a cathode ray tube based screen, an LCD or LED screen that is connected, for example, to a PC or laptop. For the display means, output means for a preexisting machine control unit can also be used.

It is particularly advantageous when the cable that is to be stripped can be depicted on the monitor screen as a virtual model, wherein the respective contacts with the conductor on a virtual stripped conductor end of the model are depicted graphically. Because the conductor quality of the stripped conductor end is particularly easy to discern by operating personnel from a graphical depiction of this type, the method parameters for the stripping process (particularly the cutting depth, wayback) for a readjustment can be readily optimized. The operation guidance is significantly facilitated in this manner, and potential sources of error are reduced. It is also conceivable that the readjustment be automated, for which purpose an image processing and/or analysis software installed on a computer can be used.

Furthermore, it can be advantageous when the longitudinal extension of each contact with the conductor can be determined with respect to the longitudinal direction by a detection means and the position detection system. The longitudinal extension of the conductor contact can be referenced as a measure for the extent of the damage to the conductor caused by the contact with the conductor.

By means of the longitudinal position of one or more contacts with the conductor, a classification of adequately stripped and poorly stripped cable can be carried out. Alternatively, or in addition, by means of the longitudinal position of one or more contacts with the conductor, an adjustment of the cutting depth and, if applicable, the wayback of the at least one stripping blade can be carried out. In this manner, the method for the determination of the conductor quality can be integrated in an ideal manner in an overall process for assembling cables.

A simple classification of good and bad can be obtained when the determined longitudinal position of an initial contact is compared with a predetermined threshold value, such that when the threshold value has not been exceeded, a poorly stripped cable can be detected. It is assumed thereby that after exceeding the threshold value, any contacts with the conductor are not problematic, and can thus be classified as "good." The threshold value can lie beyond the middle of the conductor end that is to be stripped for conventional cable and assembly requirements, at least with respect to the removal direction.

A further aspect of the invention concerns a device for stripping a cable according to the method described above. The device can exhibit at least one stripping blade drive for moving the respective stripping blade in the radial direction and in the longitudinal direction, a detection means for detecting contacts with the conductor, and a position detection system for detecting at least the longitudinal position of the respective stripping blade. The detection means and the position detection system can be electrically connected to a computer or another data processing unit, by means of which the respective longitudinal positions of the blade can be determined in relation to the contacts with the conductor.

A further aspect, in turn, concerns a computer program, which executes the method described above when installed on a computer, or is running on a computer. This computer program can be a component of the software for the machine control unit for operating the stripping device. The computer program could also be provided or available as a separate computer program product wherein the computer program is stored on a non-transitory computer-readable medium. A computer is understood to be a data processing means, which can process data according to a computer code. A computer of this type can be the computer of the preexisting, or converted or updated, machine control unit for operating the stripping device. A computer can also be a PC or even a portable device (e.g. laptop).

DESCRIPTION OF THE DRAWINGS

Further individual features and advantages of the invention can be derived from the following description of an embodiment example and from the drawings. They show.

DETAILED DESCRIPTION

Figure 1:
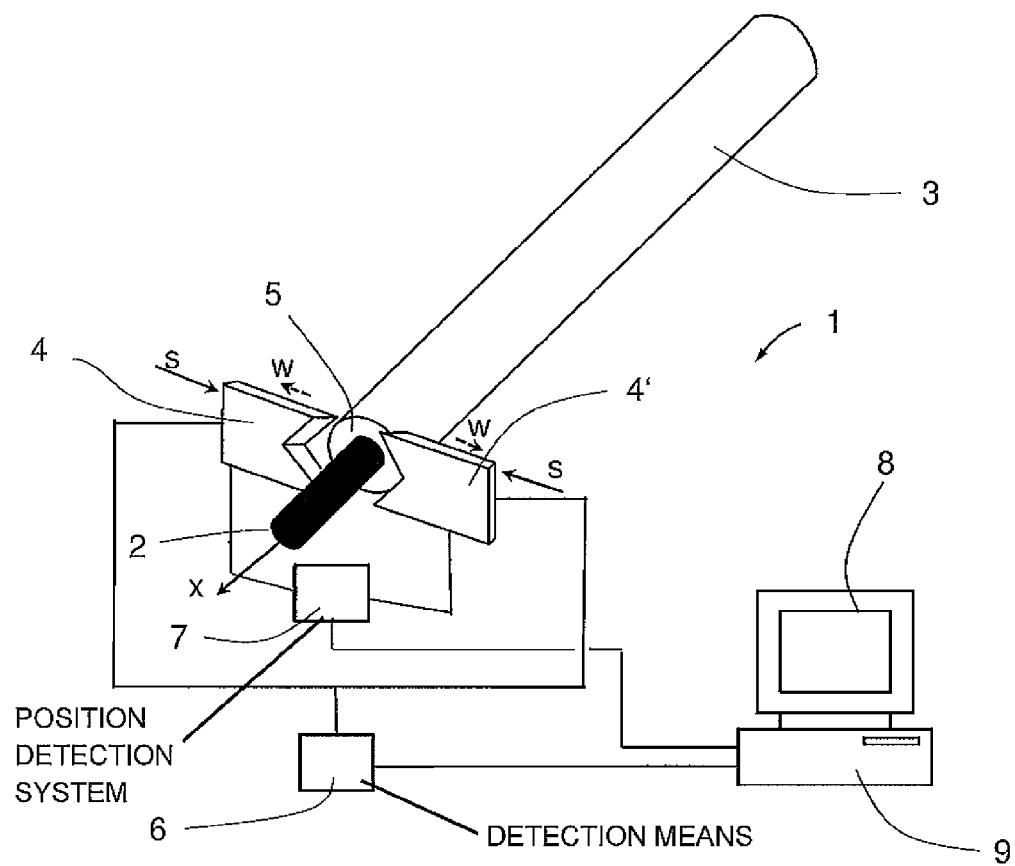
FIG. 1: a schematic depiction of a device for executing the method for stripping a cable according to the invention.

The device in FIG. 1, indicated as a whole by the numeral 1, for stripping an electrical cable 3, comprises a pair of blades having two stripping blades 4 and 4' that can be moved in opposition to one another. For cutting into the insulation 5, the blades can be moved in the radial direction against the conductor 2 of the cable 3. This closing motion is indicated with arrows s. The arrows in the counter direction, indicated with a w, indicate a potential return motion (wayback) of the stripping blades 4, 4'. After cutting into the insulation, the two stripping blades 4, 4' are slid collectively with a drive, not shown, in the x-direction for removing the cut insulation. The position of the stripping blades 4, 4' can be detected with a position detection system, indicated by the numeral 7. With a detection means or device 6, it is possible to determine whether the stripping blades 4, 4' come in contact with the conductor 2. The position detection system 7 and the detection means 6 are connected to a data processing unit 9, by means of which the respective longitudinal position x of the stripping blades can be determined when a contact with the conductor is detected. The contacts with the conductor by the stripping blades can be displayed on a monitor screen of a display means or monitor screen 8. The method is suitable for all types of cables consisting of an electrical conductor (e.g. wire or braids of copper) and a sleeve-like insulation encompassing the conductor.

The stripping blades 4, 4' according to the present embodiment example each have a V-shaped cutting geometry. It is, of course, clear that the stripping blades could also exhibit straight blades or cutting edges, respectively, or other blade geometries (e.g. with a curvature).

Figure 2:
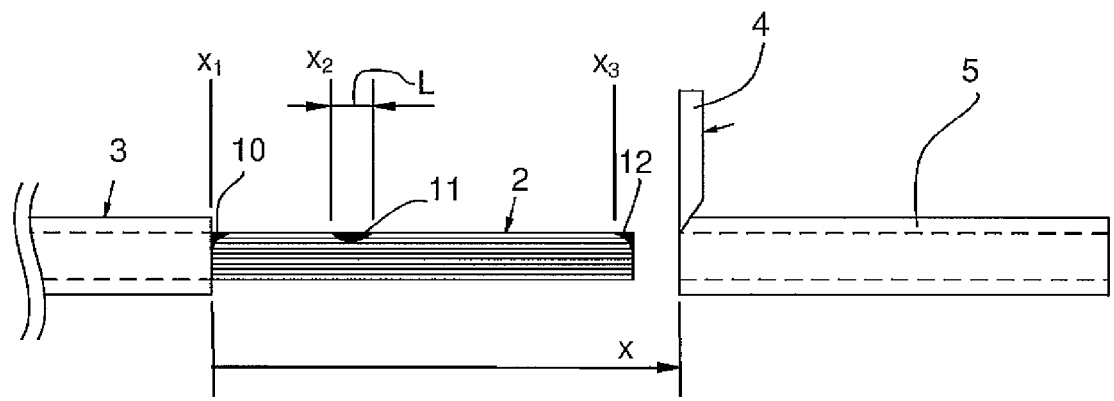
FIG. 2: a side view of a stripped conductor end with exemplary depicted conductor contacts.

FIG. 2 shows a stripped, or naked, conductor end of the conductor 2 of the cable 3; the sleeve-shaped insulation 5 that has been removed by means of the stripping, and the stripping blade 4, currently in position "x" with respect to the longitudinal direction, are likewise discernable. In the presently shown embodiment example, the conductor 2 has been damaged by contacts with the conductor during the stripping process. The three damaged regions are indicated by the numerals 10, 11, and 12. The first damaged region 10, or place of contact with the conductor, respectively, is located directly at the cutting location $x_1$ (x=0), the second damaged region 11, or place of contact with the conductor, respectively, is located at the longitudinal position $x_2$, and exhibits a longitudinal extension indicated by an L, and the third damaged region 12 is located in the region of the free end of the conductor 3 in the longitudinal position $x_3$. During the removal process, in which the stripping blade 4 is slid in the x-direction, contacts with the conductor are detected and with conductor detection, the corresponding longitudinal position x is determined with the device depicted in FIG. 1.

The method for stripping the cable 3 comprises the following steps: first, the insulation 5 of a cable 3 extending in the longitudinal direction is cut into with the stripping blade 4, the stripping blade is moved thereby in the radial direction against the cable. Then, if applicable, the stripping blade is pulled back slightly (wayback) by means of a motion in the opposite direction (i.e. toward the open position). Following the cutting, the cut insulation is removed by sliding the stripping blade 4 in the longitudinal direction. During the removal procedure, it is determined by the detection means (not shown here) whether the stripping blade 4 has come in contact with the conductor 2. For each contact with the conductor, the longitudinal position (x) of the one stripping blade 4 is identified. The data acquired in this manner can be displayed on a monitor screen. The depiction on the monitor screen can resemble that in FIG. 2. The stripped cable 3 can be depicted as a simplified virtual model in the exemplary form shown therein. The respective contacts with the conductor 10, 11, 12 are graphically depicted on the virtual stripped conductor end.

Based on the longitudinal positions x and preferably taking into consideration the longitudinal extensions of the contacts with the conductor, a classification of adequately or poorly stripped cable can be carried out. Based on this information, an adjustment of the cutting depth for the stripping blade 4 can also be carried out. For the classification, the determined longitudinal position of an initial contact is compared with a predetermined threshold value, such that when the threshold value has not been exceeded, a poorly stripped cable can be identified. If AL is the length of the stripped end of the cable, then the threshold value can lie, for example, at 0.9 AL. The threshold value for conventional cables and assembly requirements lies at least beyond the middle of the conductor end that is to be stripped (i.e. threshold value>0.5 AL). Stripped cables, with which contacts with the conductor occur in the first half of the stripping procedure, are thus classified as "poor."

With a depiction in the manner of FIG. 2, the machine operator receives valuable support for adjusting the cable processing machine, such as for finding the optimal values for the cutting depth and the wayback.

To detect the contacts with the conductor 2, a detection means 6 equipped with a capacitive sensor can be used, for example. The sensor is connected to the stripping blade or blades 4, 4', and designed such that a contact by the conductive blade with the conductor of the cable can be detected by means of an increase in capacitance, wherein the capacitance is inversely proportional to the voltage. From patent publication DE 10 2007 053 825 A1, a stripping device has become known, in which it can be determined by means of a capacitive sensor whether a contact with the conductor has occurred.

The detection means shown therein could also be used for executing the method according to the invention, after it has been adapted accordingly. Of course, other detection means and methods for executing the method described above for determining the conductor quality of a stripped conductor end of a cable are, however, also conceivable.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for stripping a cable, the cable including a conductor, and determining a conductor quality of a stripped conductor end of the cable, comprising the steps of:
    cutting into an insulation encompassing the conductor of the cable, the conductor extending in a longitudinal direction of the cable, with at least one stripping blade;
    removing the cut insulation by sliding the at least one stripping blade in the longitudinal direction; and
    identifying a longitudinal position of the at least one stripping blade during the cut insulation removal in response to determining by a detection means that the at least one stripping blade has come into contact with the conductor;
    wherein the identified longitudinal position of the contact with the conductor by the at least one stripping blade is displayed on a monitor screen; and
    wherein the cable is displayed as a virtual model on the monitor screen and wherein the contact of the at least one stripping blade with the conductor is graphically depicted on a virtual stripped conductor end.

2. The method according to claim 1 wherein a longitudinal extension of the contact is identified with respect to the longitudinal direction.

3. The method according to claim 1 wherein based on the longitudinal position of the contact a classification of one of an adequately stripped cable and a poorly stripped cable is generated as an output.

4. The method according to claim 1 wherein based on the longitudinal position of the contact an adjustment of a cutting depth of the at least one stripping blade is carried out.

5. The method according to claim 1 wherein the identified longitudinal position of the contact is compared with a predetermined threshold value and, when the threshold value has not been exceeded, a classification as a poorly stripped cable is generated as an output.

6. A computer program product comprising at least one computer program stored on a non-transitory computer-readable medium for execution by a data processing unit for operating a device for stripping a cable by performing a method comprising the steps of:
    cutting into an insulation of a cable, the insulation encompassing a conductor extending in a longitudinal direction of the cable, with at least one stripping blade;
    removing the cut insulation by sliding the at least one stripping blade in the longitudinal direction;
    identifying a longitudinal position of the at least one stripping blade during the cut insulation removal in response to determining by a detection means that the at least one stripping blade has come in contact with the conductor; and
    displaying the cable as a virtual model on a monitor screen and wherein the contact of the at least one stripping blade with the conductor is graphically depicted on a virtual stripped conductor end.

7. The computer program product according to claim 6 wherein based on the longitudinal position of the contact a classification of one of an adequately stripped cable and a poorly stripped cable is generated as an output.

8. The computer program product according to claim 6 wherein based on the longitudinal position of the contact an adjustment of a cutting depth of the at least one stripping blade is carried out.

9. The computer program product according to claim 6 wherein the identified longitudinal position of the contact is compared with a predetermined threshold value and, when the threshold value has not been exceeded, a classification as a poorly stripped cable is generated as an output.

10. A device for stripping a cable comprising:
    at least one stripping blade movable against a cable in a radial direction for cutting into an insulation of the cable, the insulation encompassing a conductor extending in a longitudinal direction of the cable, and the at least one stripping blade movable in the longitudinal direction for removing the cut insulation by sliding the at least one stripping blade in the longitudinal direction;
    a position detection system for identifying a longitudinal position of the at least one stripping blade during the cut insulation removal in response to contact between the at least one stripping blade and the conductor determined by a detection device; and
    a monitor screen for displaying the cable as a virtual model and wherein the contact of the at least one stripping blade with the conductor is graphically depicted on a virtual stripped conductor end at the identified longitudinal position.

11. The device according to claim 10 wherein the position detection system and the detection device are connected to a data processing unit that determines the longitudinal position from data generated by the position detection system and the detection device.

* * * * *